(12) United States Patent
Burnett et al.

(10) Patent No.: US 11,185,794 B2
(45) Date of Patent: Nov. 30, 2021

(54) METHOD OF FRACTION COLLECTION FOR A LIQUID CHROMATOGRAPHY SYSTEM

(71) Applicant: Waters Technologies Corporation, Milford, MA (US)

(72) Inventors: Joshua A. Burnett, Taunton, MA (US); James Usowicz, Webster, MA (US); Marc Lemelin, Douglas, MA (US); Lucas O. Tiziani, Brighton, MA (US); John Lamoureux, Franklin, MA (US); Aaron Lebeau, Taunton, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 908 days.

(21) Appl. No.: 14/632,049

(22) Filed: Feb. 26, 2015

(65) Prior Publication Data
US 2015/0246296 A1 Sep. 3, 2015

Related U.S. Application Data

(60) Provisional application No. 61/946,202, filed on Feb. 28, 2014, provisional application No. 62/086,318, filed on Dec. 2, 2014.

(51) Int. Cl.
*B01D 15/10* (2006.01)
*B01D 15/24* (2006.01)
*G01N 30/80* (2006.01)

(52) U.S. Cl.
CPC ........... *B01D 15/10* (2013.01); *B01D 15/247* (2013.01); *G01N 30/80* (2013.01)

(58) Field of Classification Search
CPC ....... B01D 15/10; B01D 15/247; G01N 30/80
See application file for complete search history.

(56) References Cited

U.S. PATENT DOCUMENTS 6,694,265 B2   2/2004  Gorenstein
2011/0020224 A1*  1/2011  Piazzi ................ A61K 51/1045
                                                   424/1.69

FOREIGN PATENT DOCUMENTS

EP    0921394 A1    6/1999
JP    H03282255 A   12/1991

OTHER PUBLICATIONS

Machine translation of JPH03282255. Kenji et al. Apparatus for Recovering Separated Component of Analysis Sample. 1991.*

(Continued)

*Primary Examiner* — Benjamin L Lebron
(74) *Attorney, Agent, or Firm* — Schmeiser, Olsen & Watts LLP; William G. Guerin (57) ABSTRACT

Described are a fraction collector and a method of fraction collection for a liquid chromatography system. The method includes diverting a liquid chromatography system flow from a waste channel to a collection tube at a start of a fraction collection window and collecting the system flow dispensed from the collection tube during the fraction collection window. At the end of the window, the system flow is diverted to the waste channel and a flow of a wash solvent is provided to the collection tube to dispense liquid remaining in the collection tube at the end of the window from the collection tube. The method can increase the amount of the collected fraction and can reduce or eliminate cross-contamination of a subsequently collected fraction. The method is useful for analytical scale applications where the collected fractions may have volumes defined by a limited number of drops dispensed from the collection tube.

19 Claims, 8 Drawing Sheets

(56) References Cited

OTHER PUBLICATIONS

Combined Search and Examination Report in counterpart UK Patent Application No. GB1502125.6, dated Oct. 8, 2015; 7 pg.

Agilent Technologies, "Agilent 1260 Infinity Analytical-scale Fraction Collector: Features, Technical Details, Specifications and Ordering Details", Jul. 1, 2010, Agilent.com; 4 pages.

Agilent Technologies, "Agilent 1260 Infinity Analytical-scale and Preparative-scale Fraction Collectors: User Manual", 2010, Agilent.com; 162 pages.

Thermo Fisher Scientific, "Thermo Scientific Dionex AFC-3000 Automated Fraction Collector", 2013, ThermoScientific.com; 3 pages.

Thermo Fisher Scientific, "Thermo Scientific Dionex UltiMate 3000 Series: Automated Fraction Collector AFC-3000 Operating Instructions", Oct. 2013, Revision 1.2, ThermoScientific.com, 88 pages.

Agilent Technologies, "Agilent 1200 Series Purification Systems", Aug. 1, 2009, Agilent.com; 12 pages.

\* cited by examiner

METHOD OF FRACTION COLLECTION FOR A LIQUID CHROMATOGRAPHY SYSTEM

RELATED APPLICATIONS

This application claims the benefit of the earlier filing dates of U.S. Provisional Patent Application Ser. No. 61/946,202, filed Feb. 28, 2014 and titled "Fraction Collector for a Liquid Chromatography System," and U.S. Provisional Patent Application Ser. No. 62/086,318, filed Dec. 2, 2014 and titled "Method of Fraction Collection for a Liquid Chromatography System," the entireties of which are incorporated herein by reference.

FIELD OF THE INVENTION

The invention relates generally to a fraction collector for a liquid chromatography system. More particularly, the invention relates to a method that can reduce cross-fraction contamination during fraction collection.

BACKGROUND

A fraction collector typically refers to an apparatus that is positioned in the outlet flow stream of a liquid chromatography system and used to collect portions of the system flow into separate collection vessels such as sample tubes or vials. Each collected portion is referred to as a fraction. Each fraction is obtained by collecting the entire liquid chromatography system flow starting at a specific time and continuing for a time window of fixed duration. Alternatively, the collection of each fraction may be initiated by detection of a corresponding compound in the liquid chromatography system flow. In general, the collection of each fraction starts at a different time and the durations of the collected fractions are typically different.

A conventional hardware configuration for a fraction collector includes a diverter valve that diverts the liquid chromatography system flow from a waste channel to a collection tube or from the collection tube to the waste channel. As used herein, a collection tube includes the fluid channel through which a liquid flows from the diverter valve to a collection vessel. The fluid channel generally includes a flexible tube or conduit that extends from the diverter valve and terminates at the other end at a needle tip, or dispensing needle, where liquid is dispensed into the collection vessel.

Typically, multiple collection vessels are available and the collection of a particular fraction is preceded by automated movement of the collection tube so that the dispensing tip is positioned at the opening of a corresponding collection vessel. To begin collecting a fraction, the diverter valve is actuated so that the system flow of a liquid chromatography system is diverted through the collection tube to the appropriate collection vessel instead of passing through the waste channel.

It is generally desirable that each collected fraction includes only the compounds in the system flow during the corresponding time window when the fraction is collected, with minimal contamination from compounds of previously collected fractions. However, when the diverter valve is actuated to direct the system flow to a particular collection vessel at the beginning of the time window and later de-actuated at the end of the time window, "cross-fraction contamination" can occur. More specifically, the collection tube retains the liquid present at the end of the previous collection window. Each time the diverter valve redirects the outlet system flow back to the waste channel, the flow through the collection tube stops and the liquid in the collection tube at that time remains until the start of the next collection window. Thus the liquid in the collection tube represents a reduced sample recovery. Moreover, when the diverter valve is actuated for the next fraction collection, the collected liquid is immediately contaminated with the liquid retained in the collection tube from the previously collected fraction.

SUMMARY

In one aspect, a fraction collector for a liquid chromatography system includes a valve, a wash solvent and a collection tube. The valve has a first port to receive a liquid chromatography system flow, a second port in fluidic communication with a waste channel, a third port and a fourth port. The valve operates in a first state in which the first port is in fluidic communication with the third port and the second port is in fluidic communication with the fourth port. The valve operates in a second state in which the first port is in fluidic communication with the second port and the third port is in fluidic communication with the fourth port. The valve has a control port to receive a valve control signal to control the valve to be in one of the first or second states.

In another aspect, a method of fraction collection for a liquid chromatography system includes diverting a liquid chromatography system flow from a waste channel to a collection tube at a start of a fraction collection window. The liquid chromatography system flow dispensed from the collection tube during the fraction collection window is collected in a collection vessel. The liquid chromatography system flow is diverted to the waste channel at an end of the fraction collection window. A flow of wash solvent is provided to the collection tube to dispense at least a portion of a liquid remaining in the collection tube at the end of the fraction window from the collection tube.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

In brief overview, the invention relates to a fraction collector and to a method of fraction collection for a liquid chromatography system. The method includes diverting a liquid chromatography system flow from a waste channel to a collection tube at a start of a fraction collection window and collecting the liquid chromatography system flow dispensed from the collection tube during the fraction collection window in a collection vessel. At the end of the fraction collection window, the liquid chromatography system flow is diverted to the waste channel and a flow of a wash solvent is provided to the collection tube to dispense at least a portion of the liquid remaining in the collection tube at the end of the fraction collection window from the collection tube. The dispensing of the liquid remaining in the collection tube at the end of the fraction window can be done to increase the amount of the collected fraction and to reduce or eliminate cross-contamination of a subsequently collected fraction. As used herein, the phrase "liquid chromatography system flow" means a flow of a mobile phase through a liquid chromatography system. The liquid chromatography system flow may contain various compounds. For example, the liquid chromatography system flow at the outlet of a chromatography column includes the mobile phase and various compounds eluted at different retention times. Advantageously, the method and fraction collector are particularly beneficial for analytical scale applications where the fractions that are collected may have volumes comprising a limited number of drops dispensed from the collection tube.

The present teaching will now be described in more detail with reference to embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

Figure 1:
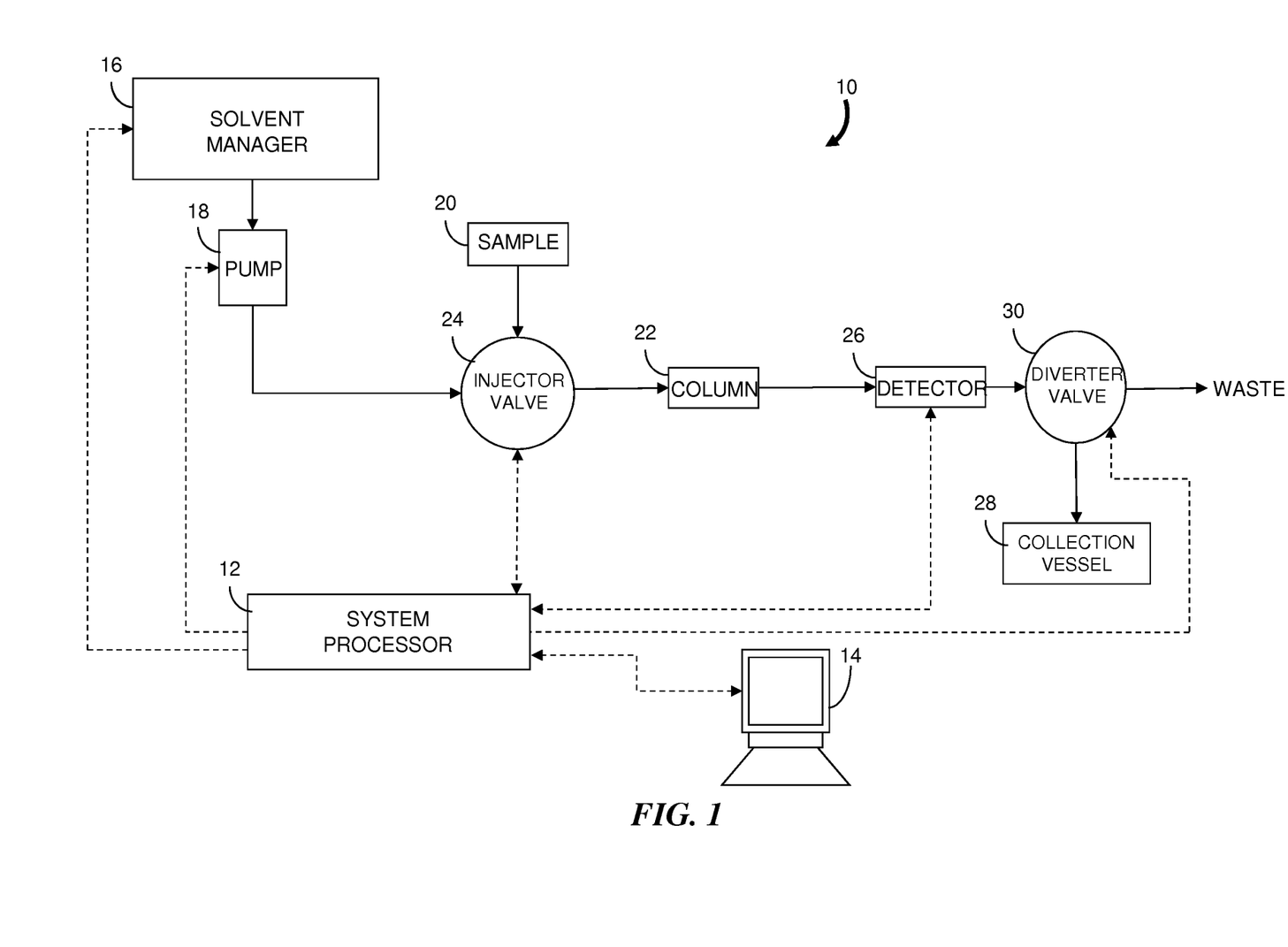
FIG. 1 is a block diagram of a liquid chromatography system that can be used to practice embodiments of the method of the invention.

FIG. 1 is a block diagram of a liquid chromatography system 10 that can be used to practice embodiments of the method of the invention. The system 10 includes a system processor 12 (e.g., microprocessor and controller) in communication with a user interface device 14 for receiving input parameters from an operator and displaying system information to the operator. The system processor 12 communicates with a solvent manager 16 which provides one or more solvents for a mobile phase. A pump system 18 includes one or more pump heads that may be configured in a variety of ways to provide one or more solvents for the mobile phase. The mobile phase may be a gradient mobile phase such that the relative contributions of two or more solvents to the mobile phase change over time. A sample from a sample reservoir, or sample container, 20 is injected into the mobile phase upstream from a chromatographic column 22 by an injector valve 24. The chromatographic column 22 is coupled to a detector 26 which provides a signal to the system processor 12 that is responsive to various components detected in the eluent from the column 22.

Figure 2:
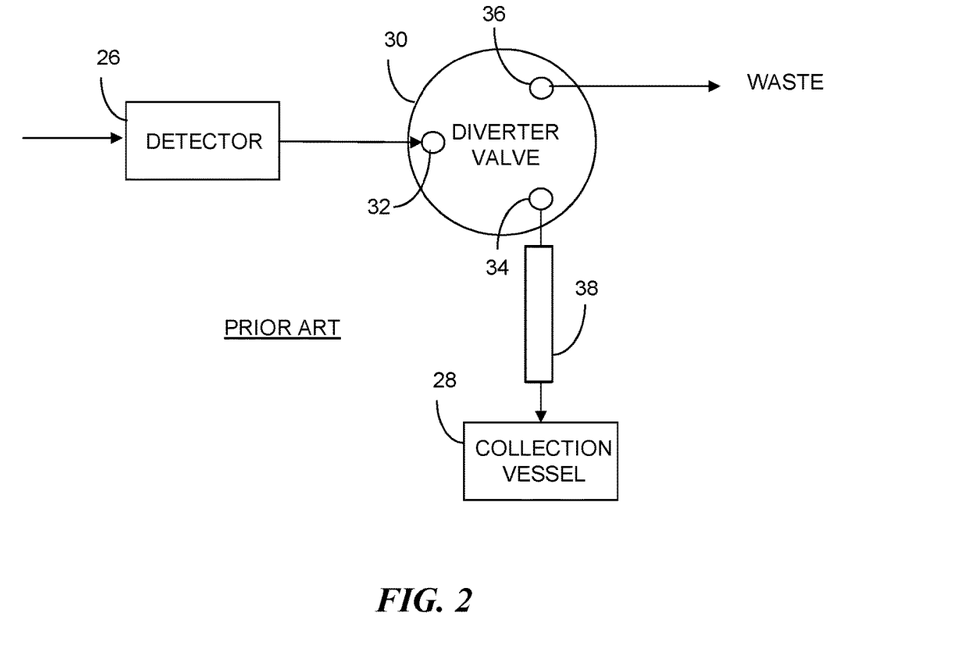
FIG. 2 is a functional block diagram of a portion of a conventional fraction collector for a liquid chromatography system.

After passing through the detector 26, the system flow exits to a waste port; however, when collecting a fraction, the system flow is diverted to a collection vessel 28. As shown in the block diagram of FIG. 2, the diversion of the system flow is achieved by actuating a diverter valve 30 so that the system flow at inlet port 32 is redirected to a collection port 34 instead of a waste port 36. The system flow from the collection port 34 flows through a collection tube 38 that typically is controlled for motion so that different fractions collected during a single separation can be directed to different collection vessels 28. As used herein, a collection tube is a fluid channel through which liquid flows from the diverter valve 30 to the collection vessel 28. Typically, the end of the collection tube 38 that is farthest from the diverter valve 30 is in the form of a needle tip that can be positioned near or at an opening of one of multiple collection vessels 28 prior to the start of the collection window for the respective fraction. The phrase "dispensing needle" is often used to refer to the needle tip and is sometimes used to refer to both the needle tip and the remainder of the collection tube 38.

Figure 3:
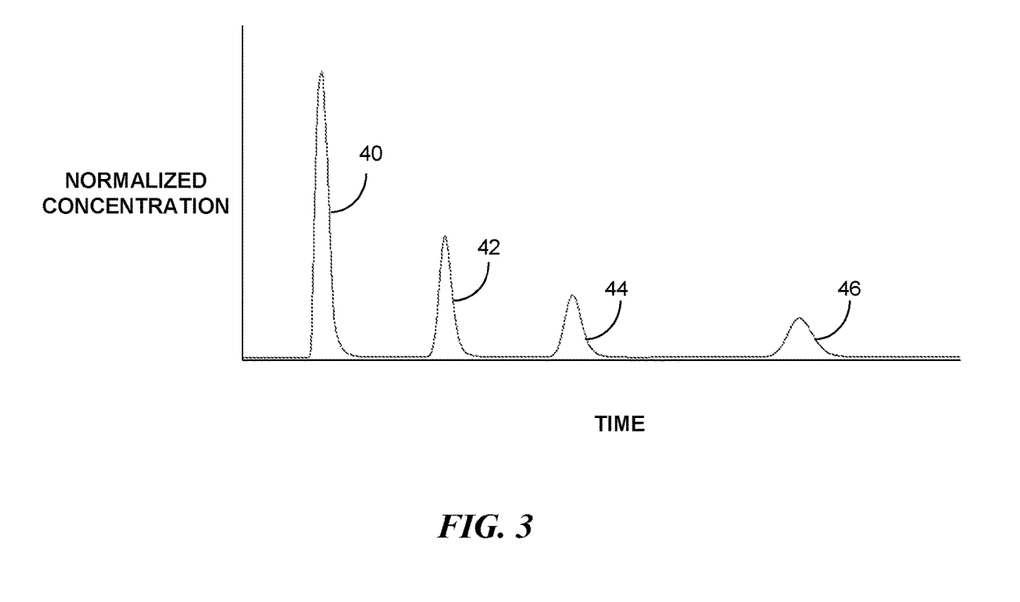
FIG. 3 is a chromatogram showing four fractions.

By way of an example, FIG. 3 is a chromatogram showing concentrations of fractions 40, 42, 44 and 46 for four different compounds in the system flow as a function of time during a single separation. Each fraction is collected in a separate collection vessel 28 by moving the dispensing needle to the proper collection vessel 28 prior to the start of collection for the fraction.

Figure 4:
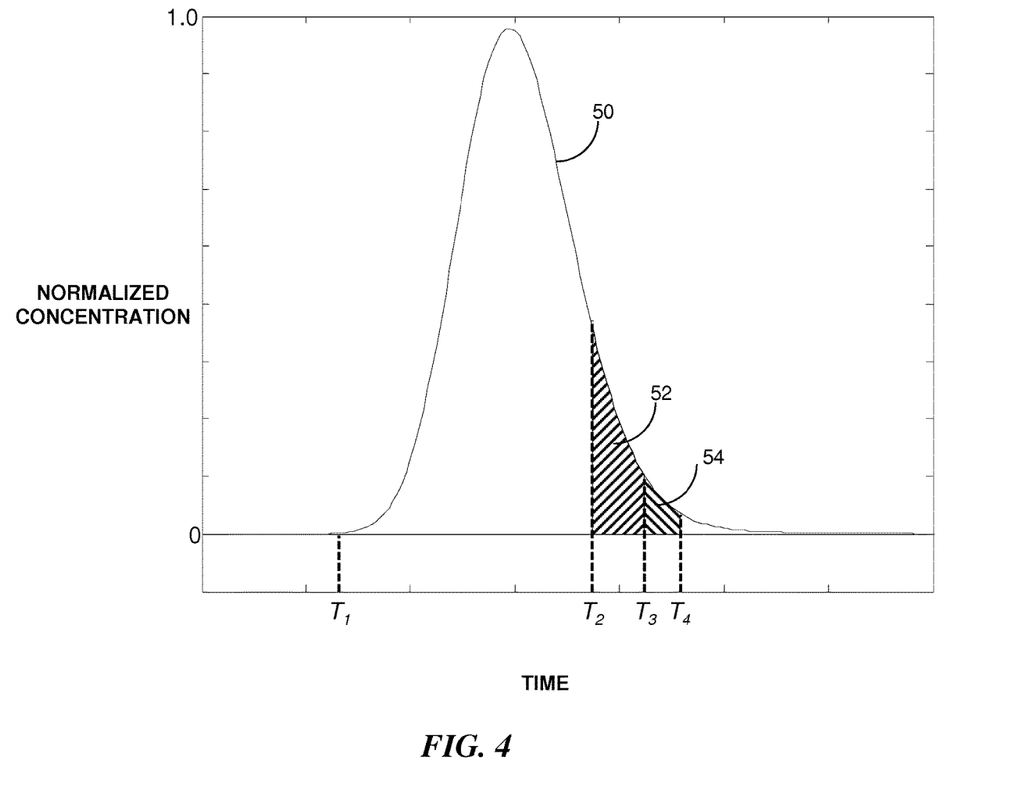
FIG. 4 is a graphical depiction of the concentration of a fraction in a liquid chromatography system flow as a function of time.

FIG. 4 illustrates the concentration of a fraction in the system flow as a function of time for a range of time that is greater than the collection time for the fraction. The plotted line 50 indicates the relative concentration of the compound. The start of the fraction collection is shown at time $T_1$ when the diverter valve is actuated to direct the system flow to the collection port. The system flow then passes through the collection tube and exits from the needle tip into the collection vessel until the end of the collection window at time $T_4$. The time between $T_1$ and $T_4$ is typically referred to as the collection window. The collection windows for various fractions can be time-based windows defined from prior knowledge of when various components elute from the chromatography column under the same or similar system parameters. Alternatively, each collection window can be a data-driven window, that is, the start time $T_1$ and end time $T_4$ are determined from a signal generated by a detector. For example, the start time $T_1$ of a particular window may be determined by the value of the signal crossing a threshold value corresponding to a predetermined concentration level or when the slope of the signal reaches a threshold value. Similarly, the collection of a fraction may be terminated at the end time $T_4$ of the window when the value of the signal or absolute value of the signal slope decreases to be less than or equal to a threshold value.

It is desirable that each collected fraction contain only the desired compound from the respective collection time window with minimal contamination from a previous collected fraction. However, a conventional system in which the diverter valve is actuated at the beginning of the window $T_1$ and turned off at the end of the window $T_4$ can easily produce "cross-fraction contamination." When the diverter valve closes and redirects the system flow back to waste, the flow through the collection tube stops and liquid remains in the collection tube and diverter valve until the beginning of the next collection window. Thus, when the diverter valve is opened at the start of the next collection window, the collected fraction is immediately contaminated with liquid from the preceding fraction. The amount of liquid retained in the collection tube and valve varies according to the particular specifications of the fraction collector. By way of examples, the volume of liquid retained in the collection tube can be on the order of tens of microliters and the volume of liquid retained in the diverter valve can exceed several microliters.

Referring again to FIG. 4, the total mass of the compound to be collected is proportional to the area under the plotted concentration line 50; however, the area 52 corresponding to the time duration between times $T_2$ and $T_3$ is proportional to the mass of the compound that remains in the collection tube 38. The area 54 corresponding to the time duration between times $T_3$ and $T_4$ indicates a smaller mass of the compound that has not yet flowed into the collection tube and remains inside the diverter valve. Generally, the liquid in the diverter valve at the end of the fraction collection is flushed out to waste before the start of the next fraction collection and results in a small sample loss; however, the larger volume retained in the collection tube can lead to cross-contamination of a subsequent fraction collection.

To address the problem of the liquid remaining in the collection tube, a user can extend the collection window to an end time that is substantially later than the original end time $T_4$. While this technique of extending the duration of the collection window may result in more mass of the desired compound being collected, there may be substantial dilution of the compound. Moreover, adequate baseline separation of the fractions is required to avoid an overlap with the collection windows for fractions that occur close in time.

Figure 5A:
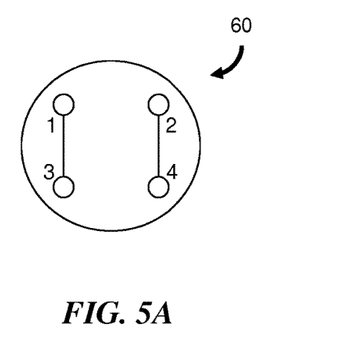
FIGS. 5A and 5B are functional diagrams of a four-port fraction valve that can be used to practice various embodiments of a method for fraction collection.
Figure 5B:
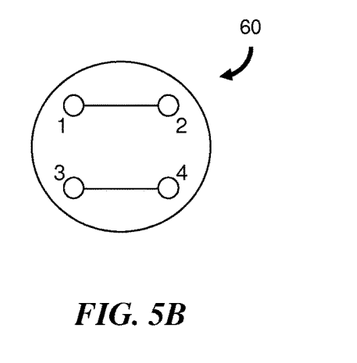

FIGS. 5A and 5B are functional diagrams of a four-port fraction valve 60 that can be included in a fraction collector used to practice various embodiments of a method for fraction collection. In FIG. 5A, the fraction valve 60 is shown in a first state in which port 1 is in fluidic communication with port 3 and port 2 is in fluidic communication with port 4. FIG. 5B shows the fraction valve 60 in a second state in which port 1 is in fluidic communication with port 2 and port 3 is in fluidic communication with port 4. The fraction valve 60 has a port (not shown) to receive a valve control signal to control the valve 60 to be in one of the two states. For example, the valve control signal can be generated by a processor in response to system timing or a detector signal.

Unlike conventional diverter valves, the fraction valve 60 allows for the collection tube to be rinsed without the use of additional valves or manifolds. The internal fluid paths preferably have smaller volume capacities than the fluid paths in conventional diverter valves and therefore the volume of liquid present in the fluid paths at the end of a collection window is substantially less. In addition, the fraction valve 60 preferably has a shorter switching time. By way of a numerical example, the inner diameter of the fluid paths may be approximately 0.25 mm (0.010 in.), the retained volume may be less than one microliter and the switching time may be less than 100 milliseconds. In a preferred embodiment, the fraction valve 60 is a rotary shear seal valve.

Figure 6A:
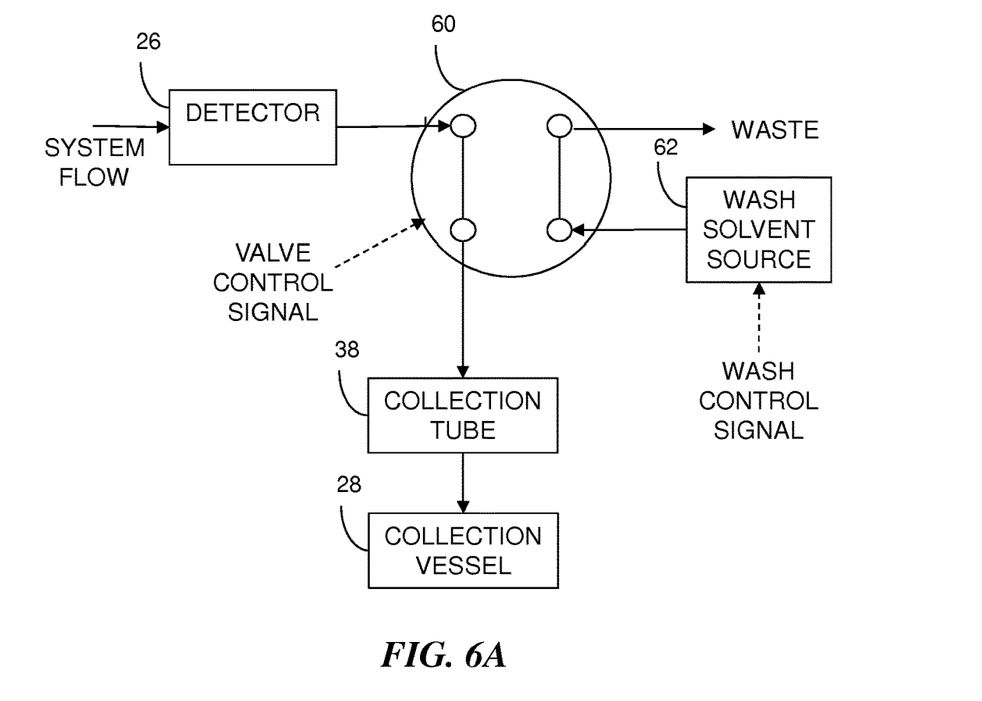
FIGS. 6A and 6B are block diagrams of a portion of a fraction collection system that includes the four-port fraction valve of FIGS. 5A and 5B, respectively.

FIG. 6A is a block diagram of a portion of a fraction collection system that includes the four-port fraction valve 60 configured in the first state (see FIG. 5A) so that the liquid chromatography system flow exiting the fraction valve 60 is diverted through a collection tube 38 and dispensed into a collection vessel 28. Concurrently, a wash solvent source 62, such as a wash syringe, is coupled to a waste channel. A wash control signal received at a control port of the wash solvent source 62 controls the flow rate of the wash solvent. For example, the wash control signal can be generated by a processor in response to system timing or a detector signal. The wash solvent source 62 is not required to be active and therefore wash solvent is not necessarily dispensed to waste. This illustrated configuration is maintained throughout the collection window for each fraction.

Figure 6B:
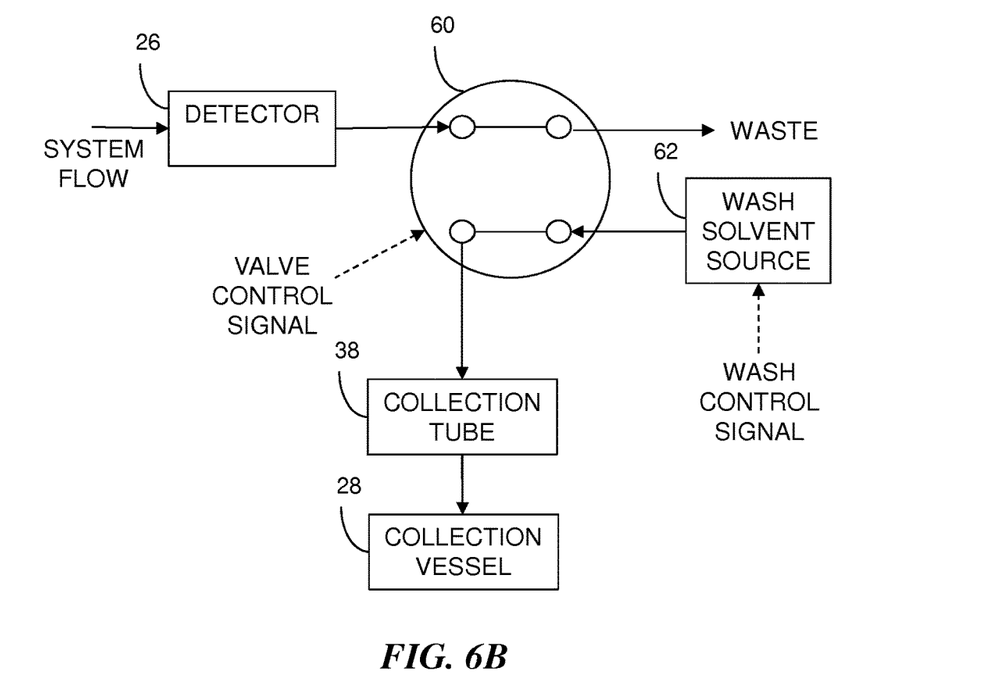

As described above, at the end of the collection window the collection tube 38 may contain a compound that can cross-contaminate a subsequent fraction collection. To reduce cross-contamination and to increase the amount of the collected fraction, the fraction valve 60 is switched to a second state (see FIG. 5B) as shown in FIG. 6B so that the liquid chromatography system flow exiting the fraction valve 60 is directed to a waste outlet and the collection tube 38 is coupled to the wash solvent source 62. This configuration is used to flush the contents of the collection tube 38 into the current collection vessel 28. In one embodiment, the wash solvent used to flush the collection tube 38 is a highly evaporative solvent so that most or all of the wash solvent retained in the collection tube evaporates prior to the start of the next fraction collection. In another embodiment, the wash solvent is the same liquid as the mobile phase.

The volume of wash solvent used to displace the contents of the collection tube 38 into the collection vessel 28 is preferably a volume that is predetermined to be equal to or slightly greater than the volume capacity of the collection tube 38. In alternative embodiments, the volume of the wash solvent used to flush the collection tube 38 is predetermined to be substantially greater than the volume capacity. For example, the liquid near the longitudinal axes of the collection tube 38 is generally more easily removed than the liquid near the inner wall. Thus the volume of wash solvent dispensed by the wash solvent source 62 may be substantially greater than the volume capacity of the collection tube 38 to ensure that nearly all the contents remaining in the collection tube 38 after the last fraction collection are displaced into the collection vessel 28. Although this alternative process results in an increased collection of the desired compound, an increased collection time is used and the result may be an increased dilution of the collected fraction.

The illustrated fraction valve 60 is configured as a single four-port, two-position valve which can be actuated, for example, using a stepper motor or DC servo motor. In another example, a two-position spring-loaded rotary solenoid is used. The spring loaded solenoid has the advantage of being in a known state in the event that power to the solenoid is terminated. It will be recognized that other types of valves and port configurations can also be used. For example, valves having other actuation mechanisms and other numbers of ports may be configured to flush the collection tube 38 into the collection vessel 28 for improved fraction collection and reduced cross-contamination. Alternatively, two or more valves may be configured to operate as a single valve system to achieve the same functionality of the illustrated fraction valve 60.

Figure 7:
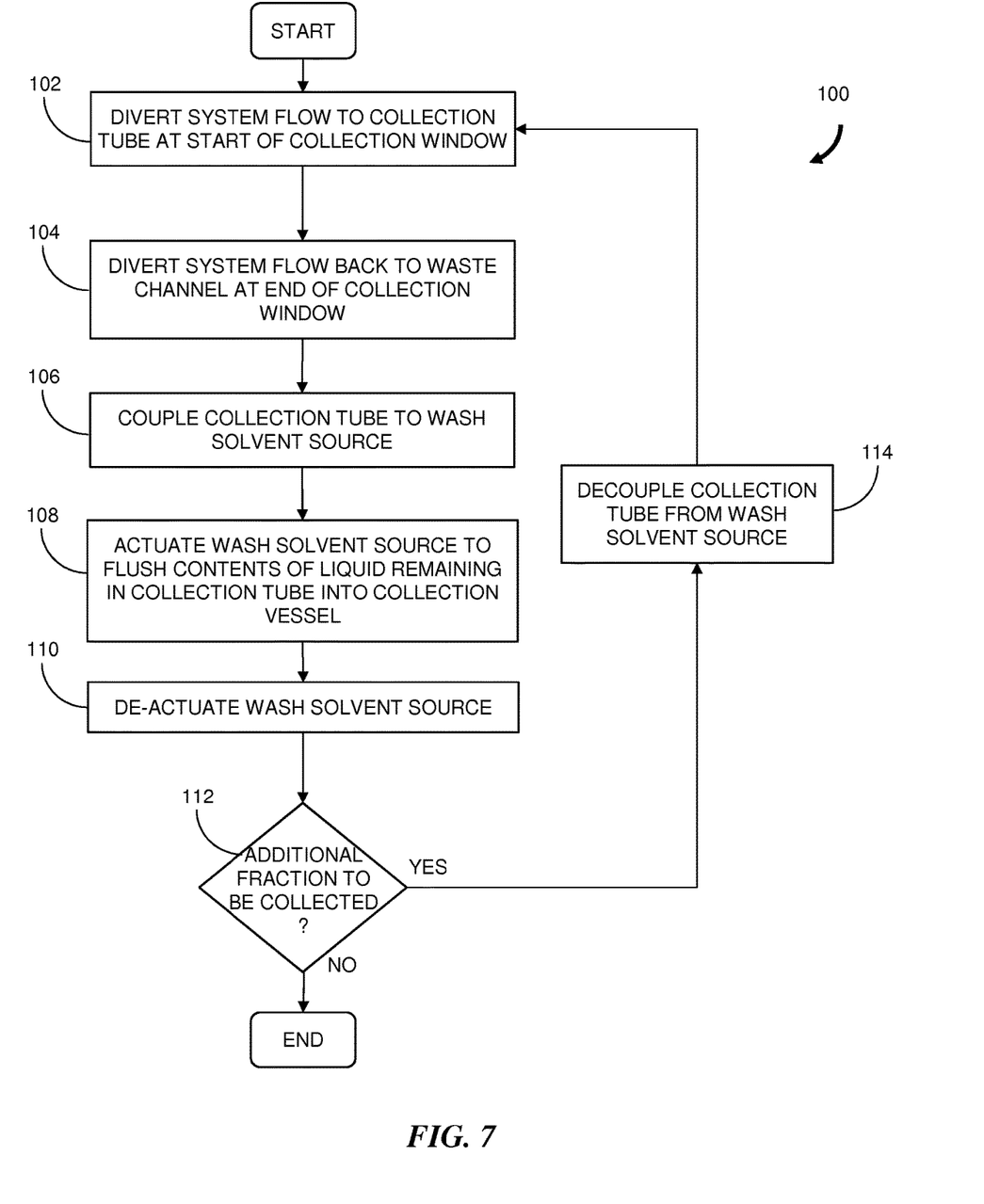
FIG. 7 is a flowchart representation of an embodiment of a method of fraction collection for a liquid chromatography system that can be practiced using the fraction valve configurations shown in FIGS. 6A and 6B.

FIG. 7 is a flowchart representation of an embodiment of a method 100 of fraction collection for a liquid chromatography system. Initially, the system flow from the liquid chromatography system passes to a waste channel. Subsequently, the fraction collector is operated to divert (102) the system flow to the collection tube at the start of a collection window. The system flow passes through the collection tube and is dispensed into the corresponding collection vessel until the system flow is diverted (104) back to waste. The collection tube is coupled (106) to a syringe or other type of wash solvent source which is then actuated to flush (108) wash solvent through the collection tube and thereby displace liquid remaining in the collection tube at the end of the collection window into the collection vessel. The volume of wash solvent used during the flush can be greater that the volume of the liquid that was in the collection tube to ensure that substantially all of the prior volume is dispensed into the collection vessel while limiting the amount of wash solvent that would contribute to dilution of the collected fraction. The wash solvent source is then de-actuated (110) to terminate the flush. If another fraction is to be collected (112), the collection tube is decoupled (114) from the wash solvent source before repeating steps 102 to 110.

Advantageously, the method 100 enables more of a compound to be accumulated in a collection vessel although the collected compound may be diluted, especially if the volume of wash solvent used to flush the collection tube is substantially greater that the volume capacity of the collection tube. In another advantage, the collection tube can be filled with clean solvent to prevent contamination of the immediately following fraction collection. In one embodiment, the solvent is the same as the mobile phase.

Figure 8A:
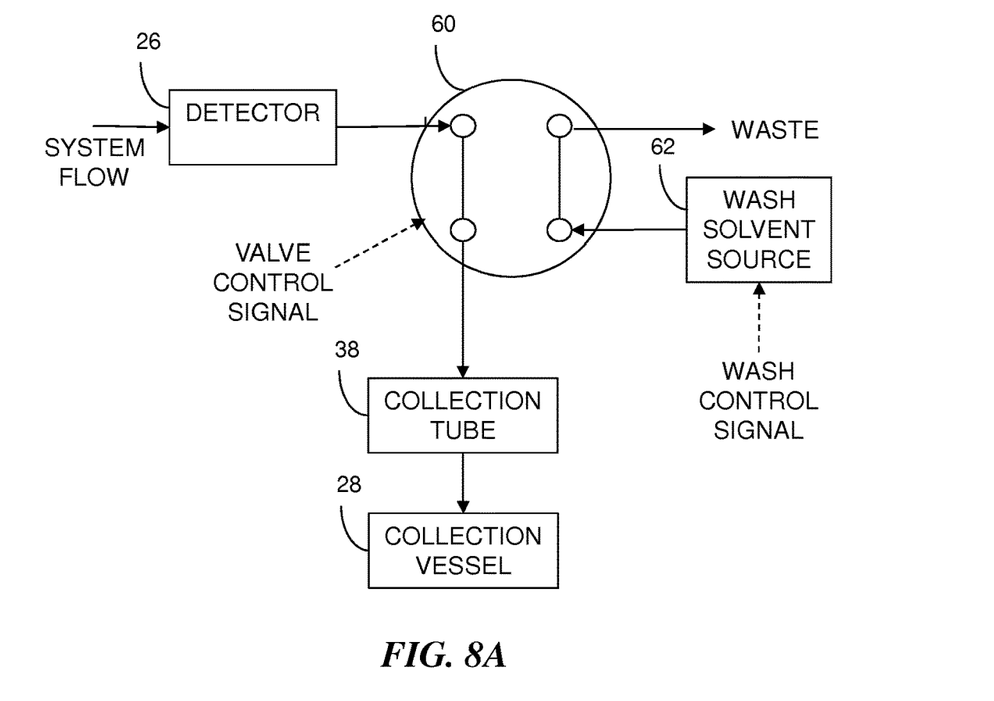
FIGS. 8A and 8B are block diagrams of a portion of a fraction collection system that includes the four-port fraction valve of FIGS. 5A and 5B, respectively.

FIG. 8A is a block diagram showing a portion of a fraction collection system that can be used to perform alternative embodiments of a method of fraction collection in a liquid chromatography system. The fraction collection system includes a four-port fraction valve 60, collection tube 38, collection vessel 28 and wash solvent source 62 as previously described. The illustrated configuration with the valve 60 in the first state is maintained throughout the collection window for each fraction.

Figure 8B:
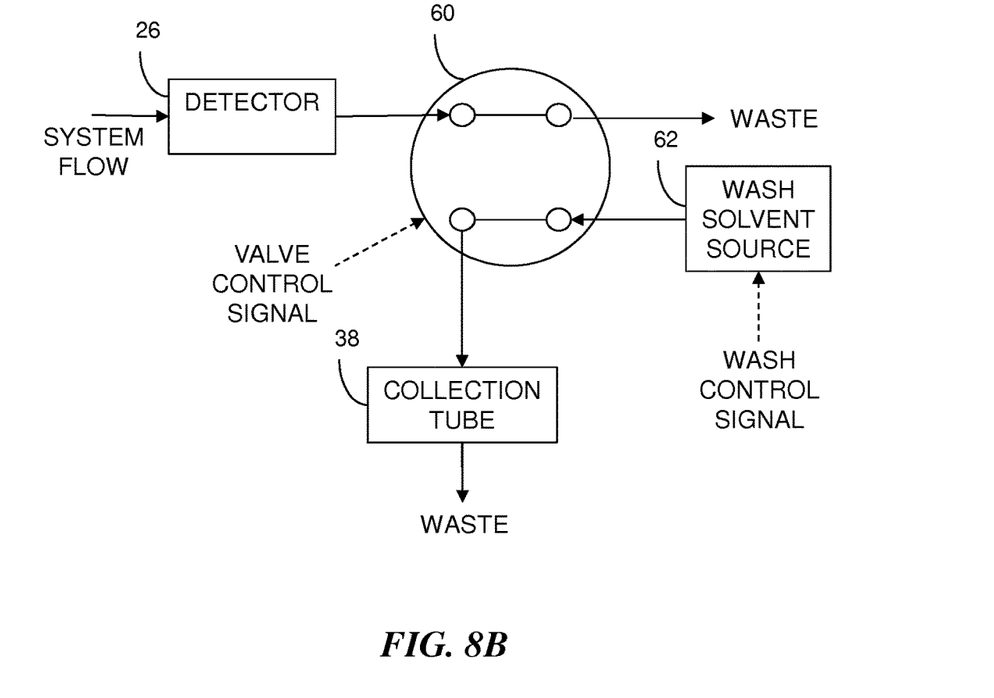

At the end of the collection window, the collection tube 38 is repositioned so that any liquid dispensed after the end of the collection window flows into a waste channel and the valve 60 is changed to be in the second state as shown in FIG. 8B. The fraction valve 60 directs the liquid chromatography system flow to a waste channel and fluidically couples the collection tube 38 to the wash solvent source 62. Wash solvent from the wash solvent source 62 is used to rinse the collection tube 38 so that the retained contents flow to waste.

Figure 9:
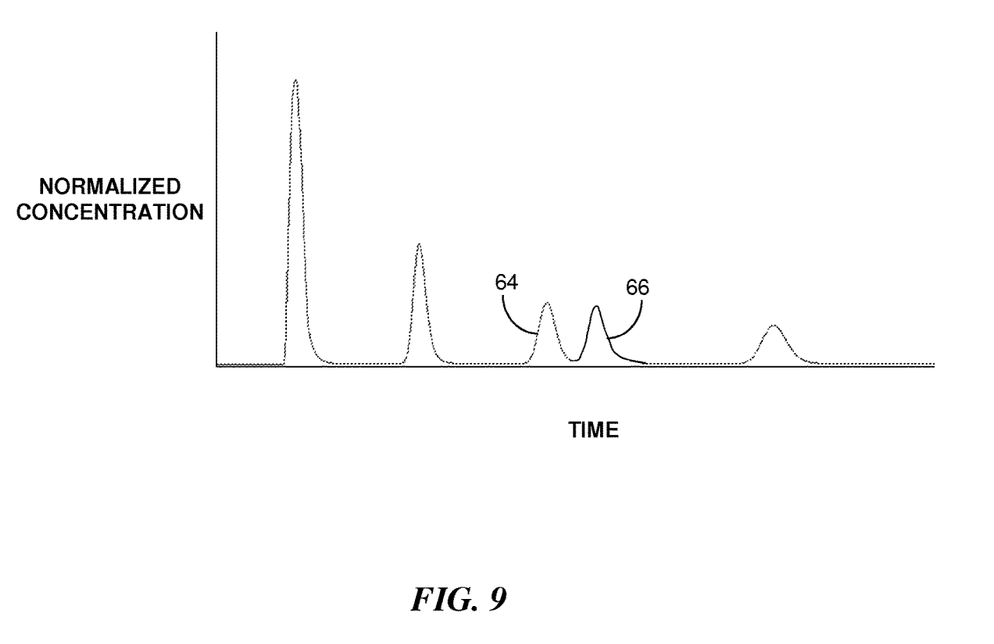
FIG. 9 is a chromatogram showing five fractions, including two fractions with no baseline separation.

Advantageously, the flow rate of the wash solvent can be substantially greater than the flow rate of the liquid chromatography system flow so that the collection tube 38 can be rinsed quickly and made available for a subsequent fraction collection. This embodiment is particularly beneficial for fraction collections in which fractions may occur close in time or have no baseline separation, as shown by the fractions 64 and 66 in FIG. 9. In this instance, a user may collect a "heart-cut" from the middle of each of the two peaks 64 and 66 to obtain the highest purity fractions. A rapid rinse of the collection tube 38 between the two fraction collections helps to ensure that the collected compound for the second peak 66 is not cross-contaminated by the compound collected for the first peak 64.

Preferably, the volume of wash solvent used to rinse the collection tube 38 is substantially greater than the volume capacity of the collection tube 38 to ensure sufficient rinsing has occurred. For example, the volume of wash solvent used to rinse may be several times the volume capacity of the collection tube 38 for improved removal of liquid near the inner wall of the collection tube 38 which may not flow at the same rate as liquid away from the inner wall.

Figure 10:
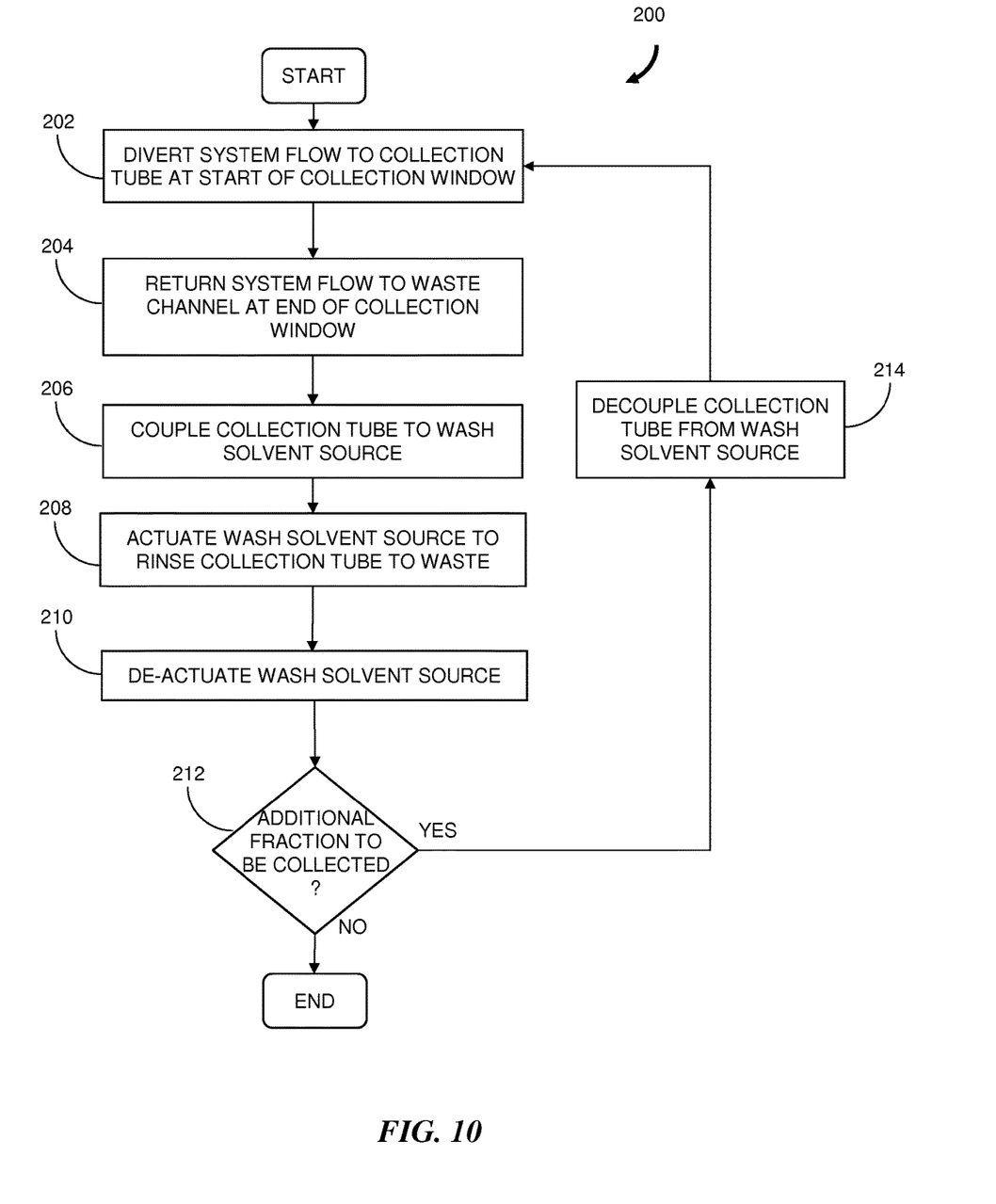
FIG. 10 is a flowchart representation of an embodiment of a method of fraction collection for a liquid chromatography system that can be practiced using the fraction valve configurations shown in FIGS. 8A and 8B.

FIG. 10 is a flowchart representation of an embodiment of a method 200 of fraction collection for a liquid chromatography system that can be practiced using the valve configurations shown in FIGS. 8A and 8B. Initially, the system flow from the liquid chromatography system passes to waste. Subsequently, the fraction collector is operated to divert (202) the system flow to the collection tube at the start of a collection window. The system flow passes through the collection tube and is dispensed into the corresponding collection vessel until the system flow is diverted (204) back to waste. After the end of the collection window, the collection tube is coupled (206) to the wash solvent source before actuating the wash solvent source to supply a flow of wash solvent to rinse (208) the collection tube. The liquid dispensed from the collection tube during the rinse is conducted through a waste channel. The volume of wash solvent used during the rinse can be substantially greater that the volume of the liquid that was in the collection tube to ensure that most or all of the liquid from the first collection window is removed from the collection tube. For example, the volume of wash solvent used to rinse the collection tube can be at least twice the volume of the liquid that remained at the end of the collection window and, in some embodiments, may be substantially greater. Preferably, the flow rate of the wash solvent used to rinse the collection tube is greater than the system flow rate so that the collection tube can quickly be made available for the next fraction collection.

The wash solvent source is then de-actuated (210) to terminate the rinse. If one or more fractions remain to be collected (212), the collection tube is decoupled (214) from the solvent source. Steps 202 to 210 are then repeated to collect the next fraction and rinse the collection tube.

Advantageously, the collection tube can be rapidly rinsed with clean wash solvent to prevent contamination of the immediately following fraction collection. The rate at which the wash solvent is supplied to the collection tube does not have to be constant. For example, a high rinse flow rate is desirable after completing a fraction collection when the following fraction collection occurs soon afterwards or when the two fractions overlap in time. The high rinse flow rate may be substantially greater than the system flow rate. In contrast, a lower flow rate is optionally employed after a fraction collection when there is ample time available before the start of the next fraction collection.

In various embodiments of a method for fraction collection in a liquid chromatography system, a wash syringe or positive displacement pump is used as the wash solvent source to supply a solvent to flush or rinse a collection tube to remove liquid left within the tube during a fraction collection. In alternative embodiments, the wash solvent source may include a pump to draw a wash solvent from a container or reservoir and to supply the solvent to the collection tube. The pump may be a solenoid-driven or DC motor-driven diaphragm pump, a peristaltic metering pump or generally any pump that can supply liquid at an accurately controlled flow rate and which can be quickly actuated and de-actuated.

While the invention has been shown and described with reference to specific embodiments, it should be understood by those skilled in the art that various changes in form and detail may be made therein without departing from the spirit and scope of the invention as recited in the accompanying claims.

What is claimed is:

1. A method of fraction collection for a liquid chromatography system, the method comprising:
    diverting a liquid chromatography system flow from a waste channel to a collection tube at a start of a fraction collection window, wherein the fraction collection window is defined as a time when a chromatographic peak corresponding to a fraction in the liquid chromatography system flow is first diverted from flowing to the waste channel to flow to the collection tube until a time when the diversion of the chromatographic peak in the liquid chromatography system flow to the collection tube is terminated, wherein a portion of the fraction is in the collection tube at an end of the fraction collection window;
    collecting the liquid chromatography system flow dispensed from the collection tube during the fraction collection window in a collection vessel;
    diverting the liquid chromatography system flow to the waste channel at the end of the fraction collection window;
    coupling a source of wash solvent to the collection tube after the end of the fraction collection window; and
    actuating the source of wash solvent after the end of the fraction collection window and the coupling of the source of wash solvent to dispense at least the portion of the fraction in in the collection tube at the end of the fraction collection window from the collection tube into the collection vessel.

2. The method of claim 1 further comprising collecting the portion of the fraction dispensed from the collection tube into the collection vessel during a flow of the wash solvent.

3. The method of claim 1 wherein a volume of the flow of the wash solvent provided to the collection tube is equal to a volume of the portion of the fraction in the collection tube at the end of the fraction window.

4. The method of claim 1 further comprising conducting the liquid dispensed from the collection tube during the flow of the wash solvent through a waste channel.

5. The method of claim 1 wherein the volume of the flow provided to the collection tube is greater than the volume of the liquid remaining in the collection tube at the end of the fraction window.

6. The method of claim 5 wherein the volume of the flow provided to the collection tube is at least twice the volume of the liquid remaining in the collection tube at the end of the fraction window.

7. The method of claim 1 wherein a flow rate of the wash solvent provided to the collection tube is greater than a flow rate of the liquid chromatography system flow.

8. The method of claim 1 further comprising de-actuating the source of wash solvent to dispense a predetermined volume of a liquid from the collection tube between the actuating and the de-actuating of the source of wash solvent.

9. A fraction collector for a liquid chromatography system for performing the method of claim 1, the fraction collector comprising:
    a valve having a first port to receive a liquid chromatography system flow, a second port in fluidic communication with a waste channel, a third port and a fourth port, the valve having a first state in which the first port is in fluidic communication with the third port and the second port is in fluidic communication with the fourth port, the valve having a second state in which the first port is in fluidic communication with the second port and the third port is in fluidic communication with the fourth port, the valve having a control port to receive a valve control signal to control the valve to be in one of the first or second states;
    a wash solvent source in fluidic communication with the fourth port and configured to provide a flow of a wash solvent, the wash solvent source having a control port to receive a wash control signal to control the flow of the wash solvent; and
    a collection tube in fluidic communication with the third port to receive the liquid chromatography system flow when the valve is in the first state and to receive the flow of wash solvent from the wash solvent source when the valve is in the second state.

10. The fraction collector of claim 9 wherein the wash solvent source provides a predetermined volume of the wash solvent through the valve to the collection tube when the valve is in the second state.

11. The fraction collector of claim 10 wherein the predetermined volume is greater than a volume capacity of the collection tube.

12. The fraction collector of claim 9 wherein the collection tube includes a needle tip at an end that is opposite to the valve.

13. The fraction collector of claim 9 wherein the wash solvent source provides the wash solvent at a flow rate that is greater than a flow rate of the liquid chromatography system flow.

14. The fraction collector of claim 9 further comprising a collection vessel to receive a liquid dispensed from the collection tube when the valve is in the first state.

15. The fraction collector of claim 14 wherein the collection vessel receives a liquid dispensed from the collection tube when the valve is in the second state.

16. The fraction collector of claim 14 wherein the collection vessel is in communication with a waste channel when the valve is in the second state so that a liquid dispensed from the collection tube during the second state flows through the waste channel.

17. The fraction collector of claim 9 wherein the collection tube is configured for movement to a location for dispensing liquid to a collection vessel.

18. The fraction collector of claim 9 wherein the wash solvent source is a wash syringe.

19. The fraction collector of claim 9 further comprising a processor in communication with the control port of the valve and the control port of the wash solvent source to provide thereto the valve control signal and the wash control signal, respectively.

* * * * *